United States Patent
Lim et al.

(10) Patent No.: US 11,689,718 B2
(45) Date of Patent: *Jun. 27, 2023

(54) APPARATUS AND METHOD FOR VIDEO ENCODING OR DECODING

(71) Applicant: SK TELECOM CO., LTD., Seoul (KR)

(72) Inventors: Jeong-yeon Lim, Seoul (KR); Sun-young Lee, Seoul (KR); Se-hoon Son, Seoul (KR); Jae-seob Shin, Seoul (KR); Hyeong-duck Kim, Suwon-si (KR); Gyeong-taek Lee, Seoul (KR)

(73) Assignee: SK TELECOM CO., LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/730,385

(22) Filed: Apr. 27, 2022

(65) Prior Publication Data
US 2022/0256143 A1    Aug. 11, 2022

Related U.S. Application Data

(63) Continuation of application No. 17/192,831, filed on Mar. 4, 2021, now Pat. No. 11,381,815, which is a (Continued)

(30) Foreign Application Priority Data

Oct. 19, 2016   (KR) .................. 10-2016-0136068
Feb. 1, 2017    (KR) .................. 10-2017-0014634

(51) Int. Cl.
*H04N 19/11*     (2014.01)
*H04N 19/119*    (2014.01)
(Continued)

(52) U.S. Cl.
CPC .......... *H04N 19/11* (2014.11); *H04N 19/119* (2014.11); *H04N 19/159* (2014.11);
(Continued)

(58) Field of Classification Search
CPC .... H04N 19/11; H04N 19/119; H04N 19/159; H04N 19/176; H04N 19/46; H04N 19/463; H04N 19/593
(Continued)

(56) References Cited

U.S. PATENT DOCUMENTS 8,948,259 B2    2/2015  Oh et al.
9,143,786 B2    9/2015  Oh et al.
(Continued)

FOREIGN PATENT DOCUMENTS

CN    103959775 A    7/2014
CN    105141949 A    12/2015
(Continued)

OTHER PUBLICATIONS

Chinese Office Action dated Sep. 2, 2022, in connection with the Chinese Patent Application No. 201780064067.3.
(Continued)

*Primary Examiner* — Nguyen T Truong
(74) *Attorney, Agent, or Firm* — Hauptman Ham, LLP

(57) ABSTRACT

The present invention relates to efficient signaling of an intra prediction mode for predicting a current block in intra prediction coding. According to an aspect of the present invention, a video encoding apparatus divides dozens of intra modes into groups, selects a group to which an actual intra mode of the current block to be encoded belongs, and signals a value corresponding to the group. The video decoding apparatus acquires information on the group to which the actual intra mode of the current block belongs
(Continued)

from a bit-stream and then evaluates intra modes belonging to the group to select a final intra mode.

9 Claims, 11 Drawing Sheets

Related U.S. Application Data continuation of application No. 16/343,637, filed as application No. PCT/KR2017/011455 on Oct. 17, 2017, now Pat. No. 10,979,708.

(51) Int. Cl.
| | |
|---|---|
| *H04N 19/159* | (2014.01) |
| *H04N 19/176* | (2014.01) |
| *H04N 19/46* | (2014.01) |
| *H04N 19/463* | (2014.01) |
| *H04N 19/593* | (2014.01) |

(52) U.S. Cl.
CPC ............ *H04N 19/176* (2014.11); *H04N 19/46* (2014.11); *H04N 19/463* (2014.11); *H04N 19/593* (2014.11)

(58) Field of Classification Search
USPC .................................................. 375/240.12
See application file for complete search history.

(56) References Cited

U.S. PATENT DOCUMENTS

| | | |
|---|---|---|
| 9,154,796 B2 | 10/2015 | Seregin et al. |
| 9,167,251 B2 | 10/2015 | Oh et al. |
| 9,237,346 B2 | 1/2016 | Oh et al. |
| 9,270,997 B2 | 2/2016 | Oh et al. |
| 9,503,730 B2 | 11/2016 | Oh et al. |
| 9,955,169 B2 | 4/2018 | Lee et al. |
| 2011/0292994 A1 | 12/2011 | Lim et al. |
| 2013/0114707 A1 | 5/2013 | Seregin et al. |
| 2014/0086323 A1 | 3/2014 | Chuang et al. |
| 2014/0219334 A1 | 8/2014 | Park |
| 2014/0334543 A1 | 11/2014 | Lee et al. |
| 2017/0041602 A1 | 2/2017 | Oh et al. |
| 2018/0199040 A1 | 7/2018 | Lee et al. |

FOREIGN PATENT DOCUMENTS

| | | |
|---|---|---|
| CN | 105338347 A | 2/2016 |
| KR | 10-2013-0027975 A | 3/2013 |
| KR | 10-2013-0109976 A | 10/2013 |
| KR | 10-1490220 B1 | 2/2015 |
| KR | 10-2016-0057364 A | 5/2016 |
| KR | 10-1618484 B1 | 5/2016 |

OTHER PUBLICATIONS

International Search Report for PCT/KR2017/011455 dated Jan. 23, 2018.
KR10-2016-0057364 Machine Translation (Year: 2016).
KR2013-0109976 Machine Translation (Year: 2013).

APPARATUS AND METHOD FOR VIDEO ENCODING OR DECODING

CROSS-REFERENCE TO RELATED APPLICATION

This application is a continuation of U.S. patent application Ser. No. 17/192,831, filed on Mar. 4, 2021, which is a continuation of U.S. patent application Ser. No. 16/343,637, filed on Apr. 19, 2019, which is a National Phase of International Application No. PCT/KR2017/011455, filed on Oct. 17, 2017, which is based upon and the benefit of priorities from Korean Patent Application No. 10-2016-0136068, filed on Oct. 19, 2016, and Korean Patent Application No. 10-2017-0014634, filed on Feb. 1, 2017. The disclosures of the above-listed applications are hereby incorporated by reference herein in their entireties.

TECHNICAL FIELD

The present invention relates to efficiently encoding or decoding video. More particularly, the present invention relates to a method and apparatus for encoding and decoding an intra prediction mode for predicting a current block in intra prediction.

BACKGROUND ART

The statements in this section merely provide background information on the present disclosure and do not necessarily constitute prior art.

There is a plurality of intra prediction modes for intra prediction and coding for predicting pixel values included in a current picture using pixel information in the current picture. A video encoding apparatus selects one final mode for a current block which is to be encoded among a plurality of intra prediction modes, and transmits information on the selected mode to a video decoding apparatus. In this operation, most probable modes (MPMs) are used to efficiently express the selected intra mode.

FIG. 1 is a diagram showing intra modes available for intra prediction in standard HEVC. In the case of HEVC, there are a total of 35 intra modes including 33 angular modes having directionality and two non-directional modes as shown in FIG. 1. In order to encode a final intra mode of the current block to be encoded among the 35 modes, three MPMs for the current block are selected based on intra modes used for neighboring blocks around the current block and intra modes which are most frequently used statistically. A 1-bit MPM flag indicating whether the final mode of the current block is the same as the MPM is transmitted, and if the final mode is the MPM, an MPM index value is further transmitted. If the final mode is not the MPM, an explicit indication of which of the remaining modes is the final mode is transmitted.

As the resolution of the video gradually increases, the unit of a prediction block becomes also gradually larger, and accordingly many new intra modes are likely to be added. However, if the predicted MPM is still different from the final mode, the mode index value may need to be transmitted as a fixed length code in some cases.

In addition, if many intra modes are newly added and the number of the MPMs to be predicted is increased correspondingly as the size of the video increases, the prediction efficiency may be improved. However, since the representation of the MPM index value is given in a truncated unary form, the increase in the number of MPMs is rather likely to reduce compression efficiency.

Furthermore, the coding unit is generated in various shapes by partitioning according to the tree structures, correspondingly, for luma and chroma, as various intra modes calculated in luma coding can be utilized to represent Planar, DC, Vertical, Horizontal, DM, and LM modes, a typical mode (e.g., Direct Mode) may be represented by a flag and utilized for compression of the intra mode for chroma.

DISCLOSURE

Technical Problem

Therefore, the present invention has been made in view of the above problems, and it is one object of the present invention to efficiently signal an intra prediction mode for predicting a current block in intra prediction coding.

Technical Solution

In accordance with one aspect of the present invention, provided is a method of encoding video data, including determining an intra mode for predicting a current block of the video data; determining most probable modes (MPMs) for the current block of the video data; and encoding intra mode data of the current block. When any of the MPMs is not the same as the intra mode for predicting the current block, the encoding includes encoding an MPM flag indicating that the intra mode for predicting the current block is not an MPM; generating a list of non-MPMs by removing the MPMs among probable intra modes, wherein intra modes in the list of non-MPMs are divided into a plurality of groups; and encoding data indicating an index of a group to which the intra mode of the current block belongs in the list of non-MPMs.

In accordance with another aspect of the present invention, provided is a method of decoding video data, including determining most probable modes (MPMs) for a current block of the video data; decoding, from a bitstream, an MPM flag indicating whether the intra mode for predicting the current block is an MPM; and when the MPM flag indicates that the intra mode for predicting the current block is not an MPM, determining the intra mode of the current block using non-MPMs except for the MPMs among probable intra modes. The determining of the intra mode for predicting the current block using the non-MPMs includes generating a non-MPM list of the non-MPMs divided into a plurality of non-MPM groups; decoding, from the bitstream, data indicating an index of a non-MPM group to which the intra mode for predicting the current block belongs; and evaluating the non-MPMs belonging to the group indicated by the index of the non-MPM group to select an intra mode of the current block.

In accordance with yet another aspect of the present invention, provided is an apparatus for decoding video data, including a memory and one or more processors, wherein the one or more processors are configured to perform determining most probable modes (MPMs) for a current block of the video data; decoding, from a bitstream, an MPM flag indicating whether the intra mode for predicting the current block is an MPM; and when the MPM flag indicates that the intra mode for predicting the current block is not an MPM, determining the intra mode of the current block using non-MPMs except for the MPMs among probable intra modes. The determining of the intra mode for predicting the current block using the non-MPMs includes generating a non-MPM list of the non-MPMs divided into a plurality of non-MPM groups; decoding, from the bitstream, data indicating an index of a non-MPM group to which the intra mode for predicting the current block belongs; and evaluating the non-MPMs belonging to the group indicated by the index of the non-MPM group to select an intra mode of the current block.

DETAILED DESCRIPTION

Figure 1:
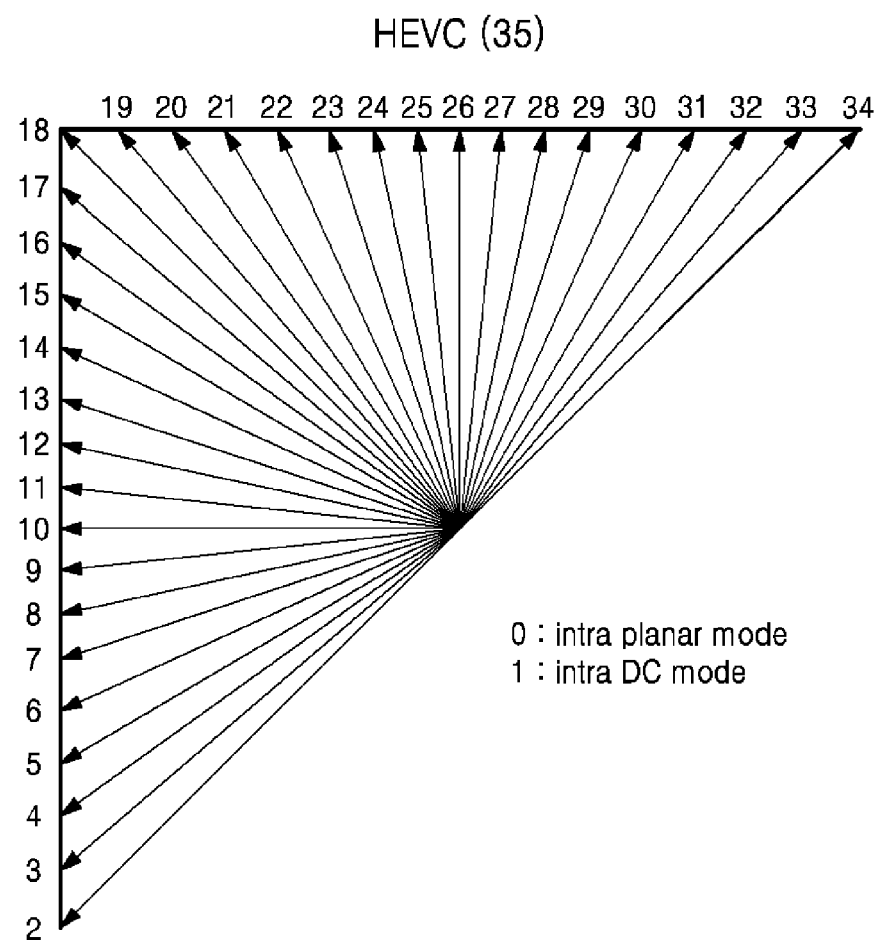
FIG. 1 is a diagram showing intra modes available for intra prediction in HEVC.

Hereinafter, some embodiments of the present invention will be described in detail with reference to the accompanying drawings. It should be noted that, in adding reference numerals to the constituent elements in the respective drawings, like reference numerals designate like elements, although the elements are shown in different drawings. Further, in the following description of the present invention, a detailed description of known functions and configurations incorporated herein will be omitted when it may make the subject matter of the present invention rather unclear.

Figure 2:
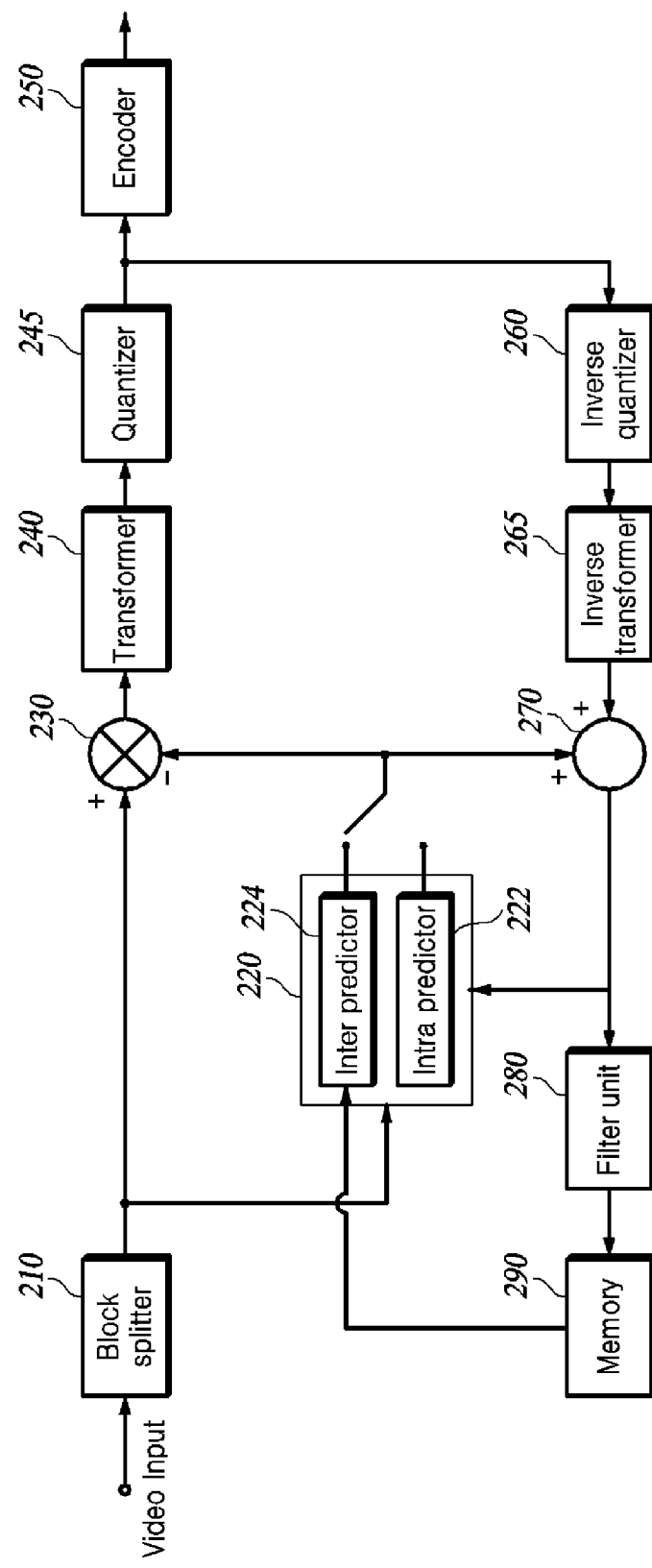
FIG. 2 is a block diagram of a video encoding apparatus according to an embodiment of the present invention.

FIG. 2 is a block diagram of a video encoding apparatus according to an embodiment of the present invention.

The video encoding apparatus includes a block splitter 210, a predictor 220, a subtractor 230, a transformer 240, a quantizer 245, an encoder 250, an inverse quantizer 260, an inverse transformer 265, an adder 270, a filter unit 280, and a memory 290. Each element of the video encoding apparatus may be implemented as a hardware chip, or may be implemented as software, and the microprocessor may be implemented to execute the functions of the software corresponding to the respective elements.

The block splitter 210 splits each picture constituting video into a plurality of coding tree units (CTUs), and then recursively splits the CTUs using a tree structure. A leaf node in the tree structure is a coding unit (CU), which is a basic unit of coding. A QuadTree (QT) structure, in which a node is split into four sub-nodes, or a QuadTree plus BinaryTree (QTBT) structure combining the QT structure and a BinaryTree (BT) structure, in which a node is split into two sub-nodes, may be used as the tree structure.

In the QuadTree plus BinaryTree (QTBT) structure, a CTU is first split according to the QT structure. Thereafter, the leaf nodes of the QT may be further split by the BT. The split information generated by the block splitter 210 by dividing the CTU by the QTBT structure is encoded by the encoder 250 and transmitted to the video decoding apparatus.

In the QT, a first flag (QT_split_flag) indicating whether to split a block of a corresponding node is encoded. When the first flag is 1, the block of the node is split into four blocks of the same size. When the first flag is 0, the node is not further split by the QT.

In the BT, a second flag (BT_split_flag) indicating whether to split a block of a corresponding node is encoded. The BT may have a plurality of split types. For example, there may be a type of horizontally splitting the block of a node into two blocks of the same size and a type of vertically splitting the block of a node into two blocks of the same size. Additionally, there may be another type of asymmetrically splitting the block of a node into two blocks. The asymmetric split type may include a type of splitting the block of a node into two rectangular blocks at a ratio of 1:3, or a type of diagonally splitting the block of the node. In case where the BT has a plurality of split types as described above, the second flag indicating that the block is split is encoded, and the split type information indicating the split type of the block is additionally encoded.

Figure 3A:
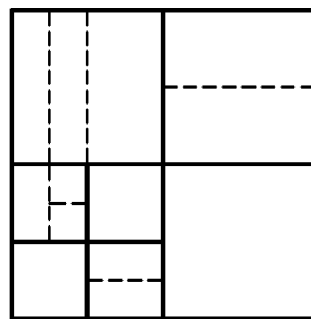
FIGS. 3A and 3B are an exemplary diagram of block partitioning using a QTBT structure.
Figure 3B:
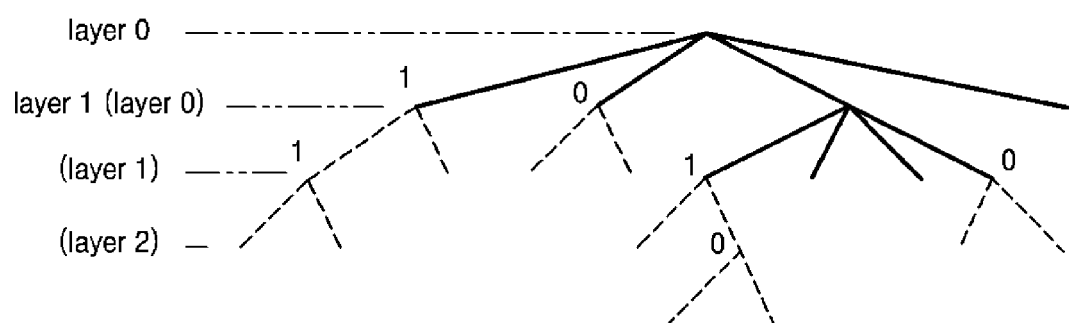

FIGS. 3A and 3B are an exemplary diagram of block partitioning using a QTBT structure. In FIG. 3A, illustrates splitting a block by a QTBT structure, and (b) represents the splitting in a tree structure. In FIGS. 3A and 3B, the solid line represents split by the QT structure, and the dotted line represents split by the BT structure. In FIG. 3B, regarding notation of layers, a layer expression without parentheses denotes a layer of QT, and a layer expression in parentheses denotes a layer of BT. In the BT structure represented by dotted lines, the numbers are the split type information.

In FIGS. 3A and 3B, the CTU, which is the uppermost layer of QT, is split into four nodes of layer 1. Thus, the block splitter 210 generates a QT split flag (QT_split_flag=1) indicating that the CTU is split. A block corresponding to the first node of layer 1 is not split by the QT anymore. Accordingly, the block splitter 210 generates QT_split_flag=0.

Then, the block corresponding to the first node of layer 1 of QT is subjected to BT. In this embodiment, it is assumed that the BT has two split types: a type of horizontally splitting the block of a node into two blocks of the same size and a type of vertically splitting the block of a node into two blocks of the same size. The first node of layer 1 of QT becomes the root node of '(layer 0)' of BT. The block corresponding to the root node of BT is further split into blocks of '(layer 1)', and thus the block splitter 210 generates BT_split_flag=1 indicating that the block is split by the BT. Thereafter, the block splitter 210 generates split type information indicating whether the block is split horizontally or vertically. In FIGS. 3A and 3B, since the block corresponding to the root node of the BT is vertically split, '1' indicating vertical split is generated as split type information. Among the blocks of '(layer 1)' split from the root node, the first block is further split according to the vertical split type, and thus BT_split_flag=1 and the split type information '1' are generated. On the other hand, the second block of (layer 1) split from the root node of the BT is not split anymore, thus BT_split_flag=0 is generated therefor.

In order to efficiently signal the information about the block partitioning by the QTBT structure to the decoding apparatus, the following information may be further encoded. This information may be encoded as header information of an image into, for example, a Sequence Parameter Set (SPS) or a Picture Parameter Set (PPS).

CTU size: Block size of the uppermost layer, i.e., the root node, of the QTBT;
MinQTSize: Minimum block size of leaf nodes allowed in QT;
MaxBTSize: Maximum block size of the root node allowed in BT;
MaxBTDepth: Maximum depth allowed in BT;
MinBTSize: Minimum block size of leaf nodes allowed in BT.

In the QT, a block having the same size as MinQTSize is not further split, and thus the split information (first flag) about the QT corresponding to the block is not encoded. In addition, in the QT, a block having a size larger than MaxBTSize does not have a BT. Accordingly, the split information (second flag, split type information) about the BT corresponding to the block is not encoded. Further, when the depth of a corresponding node of BT reaches MaxBT-Depth, the block of the node is not further split and the corresponding split information (second flag, split type information) about the BT of the node is not encoded. In addition, a block having the same size as MinBTSize in the BT is not further split, and the corresponding split information (second flag, split type information) about the BT is not encoded. By defining the maximum or minimum block size that a root or leaf node of QT and BT can have in a high level such as a sequence parameter set (SPS) or a picture parameter set (PPS) as described above, the amount of coding of information indicating the splitting status of the CTU and the split type may be reduced.

In an embodiment, the luma component and the chroma component of the CTU may be split using the same QTBT structure. However, the present invention is not limited thereto. The luma component and the chroma component may be split using different QTBT structures, respectively. As an example, in the case of an Intra (I) slice, the luma component and the chroma component may be split using different QTBT structures.

Hereinafter, a block corresponding to a CU to be encoded or decoded is referred to as a "current block."

The predictor 220 generates a prediction block by predicting a current block. The predictor 220 includes an intra predictor 222 and an inter predictor 224.

The intra predictor 222 predicts pixels in the current block using pixels (reference pixels) located around the current block in a current picture including the current block. There is a plurality of intra prediction modes according to the prediction directions, and the neighboring pixels to be used and the calculation equation are defined differently according to each prediction mode. In particular, the intra predictor 222 may determine an intra prediction mode to be used to code the current block. In some embodiments, the intra predictor 222 may try to encode the current block using multiple intra prediction modes and then select an appropriate intra prediction mode to be used from among the tested modes. For example, the intra predictor 222 may calculate rate-distortion values using rate-distortion analysis of multiple tested intra prediction modes, and select an intra prediction mode having the best rate-distortion characteristic from among the tested modes.

Figure 4:
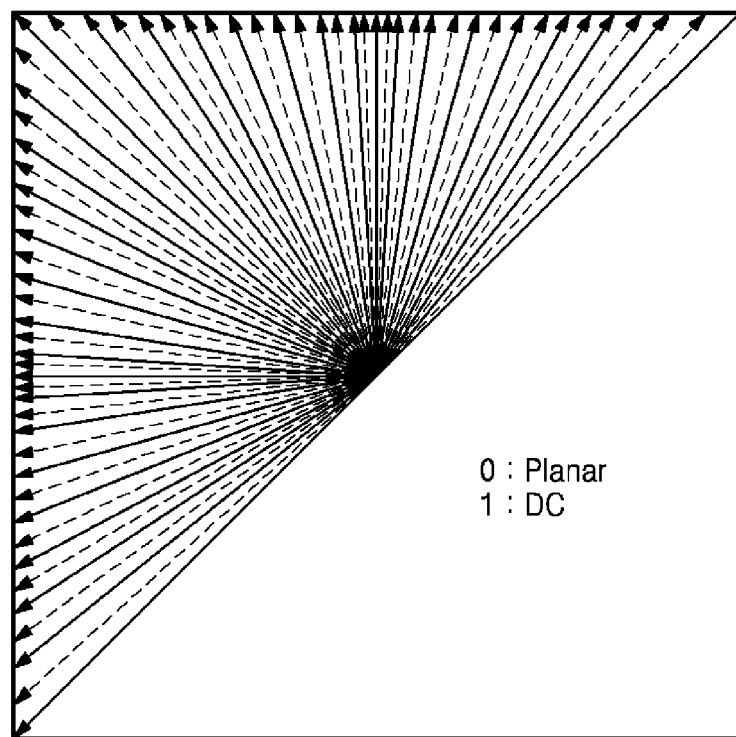
FIG. 4 shows an example of a plurality of intra prediction modes.

FIG. 4 is an exemplary diagram of a plurality of intra prediction modes.

As shown in FIG. 4, the plurality of intra prediction modes may include two non-directional modes (a planar mode and a DC mode) and 65 directional modes.

The intra predictor 222 selects one intra prediction mode from among the plurality of intra prediction modes, and generates the prediction block using reconstructed neighboring samples (reference samples) and an equation determined by the selected intra prediction mode to predict the current block. The information about the selected intra prediction mode is encoded by the encoder 250 and transmitted to the video decoding apparatus.

In order to efficiently encode intra prediction mode information indicating which of the plurality of intra prediction modes is used as the intra prediction mode of the current block, the intra predictor 222 may determine some of the intra prediction modes and consider the modes as the most probable modes (MPMs) that are most likely to be used as the intra prediction mode of the current block. Then, the intra predictor 222 generates mode information indicating whether the intra prediction mode of the current block is selected from an MPM list, and transmits the mode information to the encoder 250. Generally, when the intra prediction mode of the current block is selected from an MPM list, the intra predictor 222 transmits, to the encoder 250, first intra prediction information for indicating which mode of the MPMs is selected as the intra prediction mode of the current block. On the other hand, when the intra prediction mode of the current block is not selected from an MPM list, second intra identification information for indicating which of the remaining modes (i.e., non-MPMs) excluding the MPMs is selected as the intra prediction mode of the current block is transmitted to the encoder 250. Alternatively, the intra predictor 222 according to an aspect of the present invention may group MPMs and/or non-MPMs and signal the index of a group to which the intra prediction mode for predicting the current block belongs, instead of explicitly signaling which mode of the MPMs and/or non-MPMs is selected as the intra prediction mode for predicting the current block.

Hereinafter, a method of generating an MPM list will be described. While six MPMs are described as constituting the MPM list, the present invention is not limited thereto. The number of MPMs included in the MPM list may range from three to ten.

Figure 5:
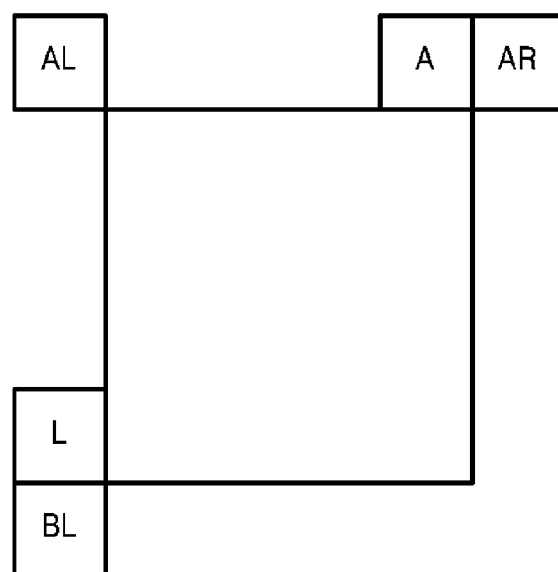
FIG. 5 is an exemplary diagram of neighboring blocks around a current block.

First, an MPM list is constructed using intra prediction modes of neighboring blocks around the current block. In an example, as shown in FIG. 5, the neighboring blocks may include, for example, a part or the entirety of a left block L, a above block A, a bottom left BL, a above right block AR, and a above left block AL of the current block. The intra prediction modes of these neighboring blocks are included in the MPM list. Here, the intra prediction modes of the only available blocks are included in the MPM list in order of the left block L, the above block A, the bottom left BL, the above right block AR, and the above left block AL, and then an MPM list is constructed by additionally adding the Planar mode and the DC mode. Alternatively, the intra prediction modes of the neighboring blocks may be added to the MPM list in order of the left block L and the above block A, the planar mode and the DC mode are added, and the intra prediction modes of the bottom left block BL, and the above right block AR, and the above left block AL are then added to the MPM list.

Only distinct intra prediction modes are included in the MPM list. That is, when there are duplicated modes, only one of the duplicated modes is included in the MPM list.

When the number of MPMs in the list is less than a predetermined number (e.g., 6), the additional MPMs may be derived by adding −1 angel mode or +1 angle mode based on the directional modes in the list. In addition, when the number of MPMs in the list is less than the predetermined number, the predefined default modes are added to the MPM list in order of the vertical mode, the horizontal mode, the diagonal mode, and so on.

The inter predictor 224 searches for a block most similar to the current block in a reference picture encoded and decoded earlier than the current picture, and generates a prediction block for the current block using the searched block. Then, the inter predictor 224 generates a motion vector corresponding to a displacement between the current block in the current picture and the prediction block in the reference picture. Motion information including information about the reference picture used to predict the current block and information about the motion vector is encoded by the encoder 250 and transmitted to the video decoding apparatus.

The subtracter 230 subtracts the prediction block generated by the intra predictor 222 or the inter predictor 224 from the current block to generate a residual block.

The transformer 240 transforms residual signals in the residual block having pixel values in the spatial domain into transform coefficients in the frequency domain. The transformer 240 may transform the residual signals in the residual block using the size of the current block as a transform unit (TU), alternatively, may split the residual block into a plurality of smaller subblocks and then transform residual signals in a transform unit (TU) corresponding to the size of each of the subblocks. There may be various methods of splitting the residual block into smaller subblocks. For example, the residual block may be split into subblocks of the same predefined size, or may be split in a manner of a quadtree (QT) which takes the residual block as a root node.

The quantizer 245 quantizes the transform coefficients output from the transformer 240 and outputs the quantized transform coefficients to the encoder 250.

The encoder 250 encodes the quantized transform coefficients using a coding scheme such as CABAC to generate a bitstream. The encoder 250 encodes information such as a CTU size, a MinQTSize, a MaxBTSize, a MaxBTDepth, a MinBTSize, a QT split flag, a BT split flag, and a split type associated with the block split such that the video decoding apparatus splits the block in the same manner as in the video encoding apparatus.

The encoder 250 encodes information about a prediction type indicating whether the current block is encoded by intra prediction or inter prediction, and encodes intra prediction information or inter prediction information according to the prediction type.

The inverse quantizer 260 inversely quantizes the quantized transform coefficients output from the quantizer 245 to generate transform coefficients. The inverse transformer 265 transforms the transform coefficients output from the inverse quantizer 260 from the frequency domain to the spatial domain and restores the residual block.

The adder 270 adds the reconstructed residual block to the prediction block generated by the predictor 220 to restore the current block. The pixels in the reconstructed current block are used as reference pixels in performing intra prediction of the next block in order.

The filter unit 280 deblock-filters the boundaries between the reconstructed blocks in order to remove blocking artifacts caused by block-by-block encoding/decoding and stores the deblock-filtered blocks in the memory 290. When all the blocks in one picture are reconstructed, the reconstructed picture is used as a reference picture for inter prediction of blocks in a subsequent picture to be encoded.

Hereinafter, a video decoding apparatus will be described.

Figure 6:
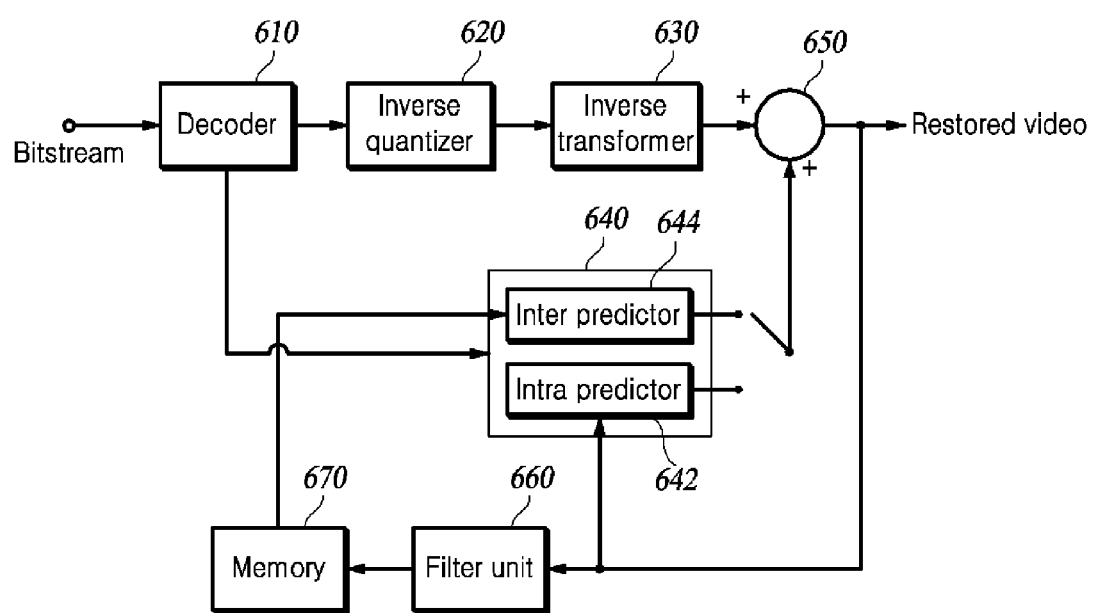
FIG. 6 illustrates a video decoding apparatus according to an embodiment of the present invention.

FIG. 6 is a block diagram illustrating a video decoding apparatus according to an embodiment of the present invention.

The video decoding apparatus includes a decoder 610, an inverse quantizer 620, an inverse transformer 630, a predictor 640, an adder 650, a filter unit 660, and a memory 670. As in the case of the video encoding apparatus of FIG. 2, each element of the video encoding apparatus may be implemented as a hardware chip, or may be implemented as software, and the microprocessor may be implemented to execute the functions of the software corresponding to the respective elements.

The decoder 610 decodes a compressed bitstream received from the video encoding apparatus, extracts information related to block partitioning to determine a current block to be decoded, and outputs prediction information necessary for restoring the current block and information about a residual signal.

The decoder 610 extracts information about the CTU size from the Sequence Parameter Set (SPS) or the Picture Parameter Set (PPS), determines the size of the CTU, and splits a picture into CTUs of the determined size. Then, the decoder 610 determines the CTU as the top uppermost layer, that is, the root node, of a tree structure, and extract split information about the CTU to split the CTU using the tree structure. For example, when the CTU is split using the QTBT structure, a first flag (QT_split_flag) related to the QT split is first extracted and each node is split into four nodes of a lower layer. For a node corresponding to a leaf node of the QT, a second flag (BT_split_flag) and a split type related to the BT split are extracted to split the leaf node of the QT in the BT structure.

In the example of the block split structure of FIGS. 3A and 3B, QT_split_flag corresponding to the node of the uppermost layer of the QTBT structure is extracted. Since the value of the extracted QT_split_flag is 1, the node of the uppermost layer is split into four nodes of a lower layer (layer 1 of QT). Then, the QT_split_flag for the first node of layer 1 is extracted. Since the value of the extracted QT_split_flag is 0, the first node of layer 1 is not further split in the QT structure.

Since the first node of layer 1 of QT is a leaf node of QT, the operation precedes to a BT which takes the first node of layer 1 of QT as a root node of the BT. BT_split_flag corresponding to the root node of the BT, that is, '(layer 0)', is extracted. Since BT_split_flag is 1, the root node of the BT is split into two nodes of '(layer 1)'. Since the root node of BT is split, split type information indicating whether the block corresponding to the root node of BT is vertically split or horizontally split is extracted. Since the split type information is 1, the block corresponding to the root node of BT is vertically split. Then, the decoder 610 BT_split_flag for the first node of '(layer 1)' which is split from the root node of the BT. Since BT_split_flag is 1, the split type information about the block of the first node of '(layer 1)' is extracted. Since the split type information about the block of the first node of '(layer 1)' is 1, the block of the first node of '(layer 1)' is vertically split. Then, BT_split_flag of the second node of '(layer 1)' split from the root node of the BT is extracted. Since BT_split_flag is 0, the node is not further split by the BT.

In this way, the decoder 610 recursively extracts QT_split_flag and splits the CTU in the QT structure. The decoder 610 extracts BT_split_flag for a leaf node of the QT. When BT_split_flag indicates splitting, the split type information is extracted. In this way, the decoder 610 may confirm that the CTU is split into a structure as shown in FIG. 3A.

When information such as MinQTSize, MaxBTSize, MaxBTDepth, and MinBTSize is additionally defined in the SPS or PPS, the decoder 610 extracts the additional information and uses the additional information in extracting split information about the QT and the BT.

In the QT, for example, a block having the same size as MinQTSize is not further split. Accordingly, the decoder 610 does not extract the split information (a QT split flag) related to the QT of the block from the bitstream (i.e., there is no QT split flag of the block in the bitstream), and automatically sets the corresponding value to 0. In addition, in the QT, a block having a size larger than MaxBTSize does not have a BT. Accordingly, the decoder 610 does not extract the BT split flag for a leaf node having a block larger than MaxBTSize in the QT, and automatically sets the BT split flag to 0. Further, when the depth of a corresponding node of BT reaches MaxBTDepth, the block of the node is not further split. Accordingly, the BT split flag of the node is not extracted from the bit stream, and the value thereof is automatically set to 0. In addition, a block having the same size as MinBTSize in the BT is not further split. Accordingly, the decoder 610 does not extract the BT split flag of the block having the same size as MinBTSize from the bitstream, and automatically sets the value of the flag to 0.

In an embodiment, upon determining a current block to be decoded through splitting of the tree structure, the decoder 610 extracts information about the prediction type indicating whether the current block is intra-predicted or inter-predicted.

When the prediction type information indicates intra prediction, the decoder 610 parses a syntax element for the intra prediction information about the current block (intra prediction mode). First, the decoder 610 parses mode information (i.e., MPM flag) indicating whether the intra prediction mode of the current block is selected from an MPM list. In general, when the intra mode encoding information indicates that the intra prediction mode of the current block is selected from an MPM list, the decoder 610 parses first intra prediction information for indicating which mode of the MPMs is selected as the intra prediction mode of the current block. When the intra mode encoding information indicates that the intra prediction mode of the current block is not selected from an MPM list, the decoder 610 parses second intra identification information for indicating which of the remaining modes (i.e., non-MPMs) excluding the MPMs is selected as the intra prediction mode of the current block. Alternatively, the decoder 610 according to an aspect of the present invention parses intra identification information (e.g., group index, etc.) indicating a group of the MPMs and/or non-MPMs to which the intra mode for predicting the current block belongs, instead of parsing intra identification information indicating which mode of the MPMs and/or non-MPMs is selected as the intra prediction mode for predicting the current block.

In an embodiment, the decoder 610 extracts information about quantized transform coefficients of the current block as information about the residual signal.

The inverse quantizer 620 inversely quantizes the quantized transform coefficients. The inverse transformer 630 inversely transforms the inversely quantized transform coefficients from the frequency domain to the spatial domain to reconstruct the residual signals, and thereby generates a residual block for the current block.

The predictor 640 includes an intra predictor 642 and an inter predictor 644. The intra predictor 642 is activated when the prediction type of the current block is intra prediction, and the inter predictor 644 is activated when the prediction type of the current block is inter prediction.

The intra predictor 642 determines an intra prediction mode of the current block among the plurality of intra prediction modes from the syntax element for the intra prediction mode parsed from the decoder 610, and predicts the current block using reference samples around the current block according to the intra prediction mode.

To determine the intra prediction mode of the current block, the intra predictor 642 constructs an MPM list including a predetermined number of MPMs from the neighboring blocks around the current block. The method of constructing the MPM list is the same as that for the intra predictor 222 of FIG. 2.

In general, when the intra prediction mode information (i.e., the MPM flag) indicates that the intra prediction mode of the current block is selected from an MPM list, the intra predictor 642 selects, as the intra prediction mode of the current block, the MPM indicated by the first intra identification information among the MPMs in the MPM list. On the other hand, when the mode information indicates that the intra prediction mode of the current block is not selected from the MPMs, the intra predictor select, as the intra prediction mode of the current block, the intra prediction mode among the intra prediction modes other than the MPMs in the MPM list, using the second intra identification information.

Alternatively, as described above, the intra predictor 222 of the video encoding apparatus according to an aspect of the present invention may group MPMs and/or non-MPMs and may signal the index of a group to which the intra mode for predicting the current block belongs, instead of explicitly signaling which mode of the MPMs and/or non-MPMs is selected as the intra prediction mode for predicting the current block. In this case, the intra predictor 642 of the video decoding apparatus may determine the optimal intra mode (i.e., the intra mode for predicting the current block) by evaluating the intra modes belonging to the group indicated by the index. For example, in some embodiments, the intra predictor 642 may generate reconstructed blocks for a plurality of intra modes belonging to the group, and evaluate the reconstructed blocks to determine an optimal intra mode.

The inter predictor 644 determines the motion information about the current block using the syntax element for the intra prediction mode extracted by the decoder 610, and predicts the current block using the determined motion information.

The adder 650 adds the residual block output from the inverse transformer 630 and the prediction block output from the intra predictor 642 or the inter predictor 644 to restore the current block. The pixels in the reconstructed current block are utilized as reference pixels for intra prediction of a block to be decoded later.

The filter unit 660 deblock-filters the boundaries between the reconstructed blocks in order to remove blocking artifacts caused by block-by-block decoding and stores the deblock-filtered blocks in the memory 290. When all the blocks in one picture are reconstructed, the reconstructed picture is used as a reference picture for inter prediction of blocks in a subsequent picture to be decoded.

The techniques described below relate to intra coding. The techniques of the present disclosure may be carried out by, for example, the video encoding apparatus and the video decoding apparatus shown in and described with reference to FIGS. 2 and 6. That is, in one example, the intra predictor 222 described with reference to FIG. 2 may perform certain techniques described below when intra prediction is performed during encoding of a block of video data. In another example, the intra predictor 642 described with reference to FIG. 6 may perform certain techniques described below when intra prediction is performed during decoding of a block of video data.

The techniques of the present disclosure are intended to improve compression performance by virtue of grouping of increased intra prediction modes. In the exemplary embodiments described below, the number of intra prediction modes is assumed to be 67, including 65 directional modes and 2 non-directional modes, as shown in FIG. 4. For the mode number (or original index) of the intra mode referred to in connection with the MPM, the mode numbers used in the standard HEVC that supports 35 intra modes are employed as shown in FIG. 1, for simplicity. However, it should be understood that the number of intra modes, the number of MPMs, the number of non-MPMs, the number of groups, and the type or setting method of MPMs are merely exemplary and various combinations thereof are possible within the scope of the present invention.

Hereinafter, a first embodiment of the present invention will be described with reference to Table 1.

for example, a variable length table or other binarization methods such as truncated unary (TU).

The video encoding apparatus and the video decoding apparatus remove the MPMs from among a plurality of intra modes and generate a list of remaining modes (i.e., non-MPMs). The video encoding apparatus and the video decoding apparatus divide the non-MPMs into a plurality of groups and assign group index numbers to the plurality of groups. The number of groups may vary depending on the number of non-MPMs. In this embodiment, the number of bits required when the number of groups is set to 4, 8, and 16 is exemplarily shown in Table 1. In addition, intra modes are not necessarily equally divided into groups (as illustrated in Table 1). The number of groups may be agreed upon between the video encoding apparatus and the video decoding apparatus, and, alternatively, a number selected from among the several possible numbers of groups may be signaled (e.g., signaled by the video encoding apparatus so as to be used by the video decoding apparatus).

In some embodiments, intra modes that use the same scanning order in scanning the transform coefficients of the residual blocks may be classified into the same group. In standard HEVC, intra modes #6 to #14 use a vertical scanning order, intra modes #22 to #30 use a horizontal scanning order, and other intra modes use a diagonal scanning order. In consideration of such scanning orders, the video encoding apparatus and the video decoding apparatus may perform grouping such that the intra modes into a group having the same scanning order. Of course, intra modes using the same scanning order are not necessarily classified into a single group, but may be classified into at least two

TABLE 1

| Flag bit | MPM | Mode Num. | Group Num. | Mode Num./Gr. | Code words | Code bits | Total bits | Prediction Block Num. |
|---|---|---|---|---|---|---|---|---|
| 1 | MPM | 3 | — | — | 0 | 1 | 2 | 1 |
|   |     |   |   |   | 10 | 2 | 3 |   |
|   |     |   |   |   | 11 | 2 | 3 |   |
| 1 | Non-MPM | 64 | 4 | 16 | 00~11 | 2 | 3 | 16 |
|   |     |   | 8 | 8 | 000~111 | 3 | 4 | 8 |
|   |     |   | 16 | 4 | 0000~1111 | 4 | 5 | 4 |

In this embodiment, three MPMs are used. Thus, 64 intra modes remain as non-MPMs. In this case, a method used in standard HEVC may be used in determining intra modes belonging to the MPMs. For example, three MPMs for the current block are selected using the neighboring blocks around the current block and/or default intra modes which are most frequently used statistically.

When the intra mode for the current block is the same as one of the MPMs, the video encoding apparatus signals a 1-bit MPM flag indicating that an MPM is used to encode the current block. In addition, the video encoding apparatus performs the signaling in a way that explicitly specifies an intra prediction mode among the three MPMs. For example, according to some embodiments, the video encoding apparatus may signal an index identifying an MPM. The video encoding apparatus may allocate an index for identifying each MPM according to the total number of MPMs and an order of determining MPMs. For example, if the total number of MPMs is 3, an index value of "0" is assigned to the intra mode of the left block L of the current block, which is determined first, and an index value of "1" is assigned to the intra mode of the above block A of the current block, which is determined next. An index value of "2" is assigned to the intra mode of the above left block AL of the current block, which is determined last. The video encoding apparatus may signal an index for identifying the MPMs using, groups. In some other embodiments, the list of non-MPMs may be sorted in ascending order according to the mode numbers of the intra modes, and the intra modes sorted in ascending order may be divided into a plurality of groups. In some other embodiments, intra modes may be grouped by an integer multiple of the mode number. For example, in dividing the modes into two groups, modes with odd mode numbers may be classified into a first group and modes with even numbers into a second group. As another example, in dividing the modes into four groups, "mode #0, mode #4, mode #8, . . . " may be classified into a first group, "mode #1, mode #5, mode #9, . . . " may be classified into a second group, "mode #2, mode #6, mode #10, . . . " may be classified into a third group, and "mode #3, mode #7, mode #11, . . . " may be classified into a fourth group. In some other embodiments, the video encoding apparatus may have grouping defined by some rules, and the rules may be signaled (e.g., signaled by the video encoding apparatus so as to be used by the video decoding apparatus).

If the intra mode for the current block is not the same as the MPMs, the video encoding apparatus signals a 1-bit MPM flag indicating that the MPM is not used to encode the current block. In addition, the video encoding apparatus further signals an index of the group to which the intra mode of the current block belongs.

The video decoding apparatus may determine the optimal intra mode by evaluating the intra modes belonging to the group. For example, in some embodiments, the video decoding apparatus may generate reconstructed blocks of the current block for a plurality of intra modes belonging to the group, and evaluate the reconstructed blocks to determine the optimal intra mode. In other words, the video decoding apparatus may measure error costs between the values of pixels of a specific portion (e.g., the top and the leftmost top) of a reconstructed block of the current block for each intra mode and the values of reconstructed pixels of spatially neighboring blocks to be decoded. The video decoding apparatus may select an intra mode with the smallest error cost as the optimal intra mode of the current block to be encoded. As an error measurement method, a sum of absolute difference (SAD), a sum of square difference (SSD), a mean square error (MSE), or the like may be used.

As illustrated in Table 1, as the number of modes per group increases, the number of bits required to specify a group to which the intra mode of the current block belongs is decreased, while the number of prediction blocks generated in order for the video decoding apparatus to evaluate the intra modes belonging to the group increases. For example, when 64 non-MPMs are divided into four groups, 16 intra modes are included in each group. 2 bits are required to specify the (index of) the group to which the intra mode of the current block belongs among the four non-MPM groups, and accordingly, the video encoding apparatus may use a total of 3 bits (1 bit of the MPM flag+2 bits for specifying the group) may be used to signal the intra prediction mode of the current block, which is a non-MPM. The video decoding apparatus needs to generate 16 prediction blocks in order to evaluate 16 intra modes belonging to the group. When 64 non-MPMs are divided into 8 groups, 8 intra modes are included in each group. 3 bits are required to specify the (index of) the group to which the intra mode of the current block belongs among the 8 non-MPM groups. Accordingly, the video encoding apparatus may use a total of 4 bits (1 bit of MPM flag+3 bits for specifying the group) to signal the intra prediction mode of the current block that is a non-MPM. The number of groups may be appropriately set in consideration of the number of bits required to signal the intra prediction mode of the current block, which is the non-MPM, and the computational complexity of the video decoding apparatus. In this embodiment, the fixed length (FL) method is used as a method of expressing the group index. However, this is merely an example. It is apparent that other binarization methods such as TU (truncated unary) can also be used.

Hereinafter, a second embodiment of the present invention will be described with reference to Table 2.

TABLE 2

| Flag bit | MPM | Mode Num. | Group Num. | Mode Num./Gr. | Code words | Code bits | Total bits | Prediction Block Num. |
|---|---|---|---|---|---|---|---|---|
| 1 | MPM | 3 | 1 | 3 | — | 0 | 1 | 3 |
| 1 | Non-MPM | 64 | 4 | 16 | 00~11 | 2 | 3 | 16 |
|   |   |   | 8 | 8 | 000~111 | 3 | 4 | 8 |
|   |   |   | 16 | 4 | 0000~1111 | 4 | 5 | 4 |

In this embodiment, three MPMs are used. Thus, 64 intra modes remain as non-MPMs. Here, a method used in standard HEVC may be used in determining intra modes belonging to the MPMs. For example, three MPMs for the current block are selected using the neighboring blocks around the current block and/or default intra modes which are most frequently used statistically.

The video encoding apparatus and the video decoding apparatus may group the MPMs into one group that is distinguished from the groups of non-MPMs. When the intra mode for the current block is the same as one of the MPMs, the video encoding apparatus signals a 1-bit MPM flag. That is, the video encoding apparatus does not explicitly signal the intra mode for the current block, but signals only a 1-bit MPM flag indicating that an MPM is used to encode the current block. Upon determining that the intra mode for the current block is the same as one of the MPMs based on the MPM flag, the video decoding apparatus evaluates the intra modes belonging to the MPMs to determine the optimal intra mode.

Signaling for non-MPMs is the same as the first embodiment related to Table 1.

Hereinafter, a third embodiment of the present invention will be described with reference to Table 3.

TABLE 3

| Flag bit | MPM | Mode Num. | Group Num. | Mode Num./Gr. | Code words | Code bits | Total bits | Prediction Block Num. |
|---|---|---|---|---|---|---|---|---|
| 1 | MPM | 5 (P, D, V, H, 34) | — | — | 0 | 1 | 2 | 1 |
|   |   |   |   |   | 10 | 2 | 3 |   |
|   |   |   |   |   | 110 | 3 | 4 |   |
|   |   |   |   |   | 1110 | 4 | 5 |   |
|   |   |   |   |   | 1111 | 4 | 5 |   |
| 1 | Non-MPM | 62 | 4 | 15 or 16 | 00~11 | 2 | 3 | 15 or 16 |
|   |   |   | 8 | 7 or 8 | 000~111 | 3 | 4 | 7 or 8 |
|   |   |   | 16 | 3 or 4 | 0000~1111 | 4 | 5 | 3 or 4 |

In this embodiment, five MPMs are used. Thus, 62 intra modes remain as non-MPMs. In this case, the statistically most frequently-used modes, for example, the planar, DC, vertical, horizontal, diagonal modes (diagonal mode 34 in FIG. 1), may be set as MPMs.

When the intra mode for the current block is the same as an MPM, the video encoding apparatus signals a 1-bit MPM flag indicating that the MPM is used to encode the current block. In addition, the video encoding apparatus performs the signaling in a way that explicitly specifying an intra prediction mode among the five MPMs.

Signaling non-MPMs is substantially the same as the first embodiment related to Table 1. However, the same number of intra modes may not be assigned to all groups. This is an agreement between the video encoding apparatus and the video decoding apparatus and does not cause any problem.

Hereinafter, a fourth embodiment of the present invention will be described with reference to Table 4.

TABLE 4

| Flag bit | MPM | Mode Num. | Group Num. | Mode Num./Gr. | Code words | Code bits | Total bits | Prediction Block Num. |
|---|---|---|---|---|---|---|---|---|
| 1 | MPM | 5 (P, D, V, H, 34) | 1 | 5 | — | 0 | 1 | 5 |
|   |   |   | 2 | 2 or 3 | 0~1 | 1 | 2 | 2 or 3 |
| 1 | Non-MPM | 62 | 4 | 15 or 16 | 00~11 | 2 | 3 | 15 or 16 |
|   |   |   | 8 | 7 or 8 | 000~111 | 3 | 4 | 7 or 8 |
|   |   |   | 16 | 3 or 4 | 0000~1111 | 4 | 5 | 3 or 4 |

In this embodiment, five MPMs are used. Thus, 62 intra modes remain as non-MPMs. In this case, the planar, DC, vertical, horizontal, and diagonal modes (diagonal mode 34 in FIG. 1), which are the statistically most frequently-used modes, may be set as MPMs.

The video encoding apparatus and the video decoding apparatus classify the five MPMs into one group or two groups. In some embodiments, the MPMs are classified into one group that is distinguished from the groups of non-MPMs. When the intra mode for the current block is the same as an MPM, the video encoding apparatus signals a 1-bit MPM flag. That is, the video encoding apparatus does not explicitly signal the intra mode for the current block, but signals a 1-bit MPM flag indicating that an MPM is used to encode the current block. Upon determining that the intra mode for the current block is the same as one of the MPMs based on the MPM flag, the video decoding apparatus evaluates the intra modes belonging to the MPMs to determine the optimal intra mode. In some other embodiments, the MPMs are divided into two groups. When the intra mode for the current block is the same as an MPM, the video encoding apparatus signals a 1-bit MPM flag and the index of the group to which the intra mode of the current block belongs. The number of MPM groups may be agreed upon between the video encoding apparatus and the video decoding apparatus, and a number selected from among the several possible numbers of groups may be signaled (e.g., signaled by the video encoding apparatus so as to be used by the video decoding apparatus).

In some embodiments, MPMs that use the same scanning order in scanning the transform coefficients of the residual blocks may be classified into the same group. In some other embodiments, the video encoding apparatus and the video decoding apparatus may divide the MPMs into a plurality of groups in order of determining the MPMs. In some other embodiments, the list of non-MPMs may be sorted in ascending order according to the mode numbers of the intra modes, and the intra modes sorted in ascending order may be divided into a plurality of groups. In some other embodiments, the video encoding apparatus may signal a grouping method.

Signaling non-MPMs is substantially the same as the first embodiment related to Table 1. However, the same number of intra modes may not be assigned to all groups. This is an agreement between the video encoding apparatus and the video decoding apparatus and does not cause any problem.

Hereinafter, a fifth embodiment of the present invention will be described with reference to Table 5.

TABLE 5

| Flag bit | MPM | Mode Num. | Group Num. | Mode Num./Gr. | Code words | Code bits | Total bits | Prediction Block Num. |
|---|---|---|---|---|---|---|---|---|
| 1 | MPM | 6 | — | — | 0 | 1 | 2 | 1 |
|   |   |   |   |   | 10 | 2 | 3 |   |
|   |   |   |   |   | 110 | 3 | 4 |   |
|   |   |   |   |   | 1110 | 4 | 5 |   |
|   |   |   |   |   | 11110 | 5 | 6 |   |
|   |   |   |   |   | 11111 | 5 | 6 |   |
| 1 | Non-MPM | 61 | 4 | 15 or 16 | 00~11 | 2 | 3 | 15 or 16 |
|   |   |   | 8 | 7 or 8 | 000~111 | 3 | 4 | 7 or 8 |
|   |   |   | 16 | 3 or 4 | 0000~1111 | 4 | 5 | 3 or 4 |

In this embodiment, six MPMs are used. Thus, 61 intra modes remain as non-MPMs. In this case, in determining the intra modes belonging to the MPMs, the method described above with reference to FIG. 5 may be used.

Signaling the MPMs and signaling the non-MPMs are substantially the same as the first embodiment related to Table 1.

Hereinafter, a sixth embodiment of the present invention will be described with reference to Table 6.

TABLE 6

| Flag bit | MPM | Mode Num. | Group Num. | Mode Num./Gr. | Code words | Code bits | Total bits | Prediction Block Num. |
|---|---|---|---|---|---|---|---|---|
| 1 | MPM | 6 | 1 | 6 | — | 0 | 1 | 6 |
|   |   |   | 2 | 3 | 0~1 | 1 | 2 | 3 |

TABLE 6-continued

| Flag bit | MPM | Mode Num. | Group Num. | Mode Num./Gr. | Code words | Code bits | Total bits | Prediction Block Num. |
|---|---|---|---|---|---|---|---|---|
| 1 | Non-MPM | 61 | 4 | 15 or 16 | 00~11 | 2 | 3 | 15 or 16 |
|   |   |   | 8 | 7 or 8 | 000~111 | 3 | 4 | 7 or 8 |
|   |   |   | 16 | 3 or 4 | 0000~1111 | 4 | 5 | 3 or 4 |

In this embodiment, six MPMs are used. Thus, 61 intra modes remain as non-MPMs. In this case, in determining the intra modes belonging to the MPMs, the method described above with reference to FIG. 5 may be used.

Signaling the MPMs and signaling the non-MPMs are substantially the same as in the fourth embodiment related to Table 4.

Hereinafter, a seventh embodiment of the present invention will be described with reference to Table 7.

TABLE 7

| Flag bit | MPM | Mode Num. | Group Num. | Mode Num./Gr. | Code words | Code bits | Total bits | Prediction Block Num. |
|---|---|---|---|---|---|---|---|---|
| 1 | MPM | 7 | — | — | 0 | 1 | 2 | 1 |
|   | (P, D, V, H, 2, 18, 34) |   |   |   | 010 | 3 | 4 |   |
|   |   |   |   |   | 011 | 3 | 4 |   |
|   |   |   |   |   | 00100 | 5 | 6 |   |
|   |   |   |   |   | 00101 | 5 | 6 |   |
|   |   |   |   |   | 00110 | 5 | 6 |   |
|   |   |   |   |   | 00111 | 5 | 6 |   |
| 1 | Non-MPM | 60 | 4 | 15 | 00~11 | 2 | 3 | 15 |
|   |   |   | 8 | 7 or 8 | 000~111 | 3 | 4 | 7 or 8 |
|   |   |   | 10 | 6 | 0000~1001 | 4 | 5 | 6 |
|   |   |   | 15 | 4 | 0000~1110 | 4 | 5 | 4 |

In this embodiment, seven MPMs are used. Thus, 60 intra modes remain as non-MPMs. In this case, MPMs may be set to the planar, DC, vertical, horizontal and three diagonal modes (directional modes 2, 18, and 34 in FIG. 1), which are most frequently used statistically.

Signaling the MPMs and signaling the non-MPMs are substantially the same as in the first embodiment related to Table 1.

Hereinafter, an eighth embodiment of the present invention will be described with reference to Table 8.

TABLE 8

| Flag bit | MPM | Mode Num. | Group Num. | Mode Num./Gr. | Code words | Code bits | Total bits | Prediction Block Num. |
|---|---|---|---|---|---|---|---|---|
| 1 | MPM 7 (P, D, V, H, 2, 18, 34) |   | 1 | 7 | — | 0 | 1 | 7 |
|   |   |   | 2 | 3 or 4 | 0~1 | 1 | 2 | 3 or 4 |
| 1 | Non-MPM | 60 | 4 | 15 | 00~11 | 2 | 3 | 15 |
|   |   |   | 8 | 7 or 8 | 000~111 | 3 | 4 | 7 or 8 |
|   |   |   | 10 | 6 | 0000~1001 | 4 | 5 | 6 |
|   |   |   | 15 | 4 | 0000~1110 | 4 | 5 | 4 |

In this embodiment, seven MPMs are used. Thus, 60 intra modes remain as non-MPM. In this case, MPMs may be set to the planar, DC, vertical, horizontal and three diagonal modes (directional modes 2, 18, and 34 in FIG. 1), which are most frequently used statistically.

Signaling the MPMs and signaling the non-MPMs are substantially the same as in the fourth embodiment related to Table 4.

Hereinafter, a ninth embodiment of the present invention will be described with reference to Table 9.

TABLE 9

| Flag bit | MPM | Mode Num. | Group Num. | Mode Num./Gr. | Code words | Code bits | Total bits | Prediction Block Num. |
|---|---|---|---|---|---|---|---|---|
| 1 | MPM | 7 | 1 | 7 | — | 0 | 1 | 7 |
|   |   | (P, D, V, H, 2, 18, 34) | 2 | 3 or 4 | 0~1 | 1 | 2 | 3 or 4 |
| 1 | Non-MPM | 60 | 2→8 | 4 or 56→7 | 00~11→ 000~111 | 1(flag) + 2 1(flag) + 3 | 4 5 | 1 7 |

In this embodiment, seven MPMs are used. Thus, 60 intra modes remain as non-MPMs. In this case, MPMs may be set to the planar, DC, vertical, horizontal and three diagonal modes (directional modes 2, 18, and 34 in FIG. 1), which are most frequently used statistically.

Signaling the MPMs is substantially the same as in the eighth embodiment related to Table 8. However, the signaling the non-MPM described below is different from the previous embodiments.

The video encoding apparatus and the video decoding apparatus classify four statistically frequently-used directional modes (e.g., directional modes 6, 14, 22, and 30 in FIG. 1, i.e., the next most probable modes) and the other (56) intra modes among the 60 non-MPMs into different groups. The video encoding apparatus signals a 1-bit flag value indicating which group the intra mode of the current block belongs to between the two groups.

When the intra mode of the current block is in the group to which the next most probable modes belong, the video encoding apparatus further signals 2 bits to specify which of the four intra modes is for the current block.

When the intra mode of the current block is not in the group to which the next most probable modes belong, the video encoding apparatus divides the other 56 intra modes into multiple groups, and then signals an index for the corresponding group. Here, the number of the groups may be changed according to the number of other intra modes. In this embodiment, the number of groups is set to 8, and 3 bits are further signaled to specify a group.

Hereinafter, a tenth embodiment of the present invention will be described with reference to Table 10.

encoding apparatus signals a 1-bit flag value indicating which group the intra mode of the current block belongs to between the two groups.

In contrast with the ninth embodiment related to Table 9, when the intra mode of the current block is in the group to which the next most probable modes belong, the video encoding apparatus does not explicitly signal which of the four intra modes is for the current block. In this case, the video decoding apparatus may determine the optimal intra mode by evaluating four (next most probable) directional modes belonging to the group.

When the intra mode of the current block is not in the group to which the next most probable modes belong, the video encoding apparatus divides the other 56 intra modes into multiple groups, and then signals a index for the corresponding group. Here, the number of the groups may be changed according to the number of other intra modes. As shown in Table 10, the number of groups is set to 8 in this embodiment.

For chroma, the intra prediction modes may further include two special modes, which are a direct mode (Intra_DM) and a linear mode (Intra_LM), in addition to the Planar, Vertical, Horizontal, and DC modes. Among such modes, a frequently-used mode may be defined with a flag or denoted with the smallest digits of a truncated unary representation, and the other modes may be grouped as in the above examples. For example, when the direct mode is most frequently used, a flag indicating whether the mode is used as on/off may be signaled or denoted in one digit according to the truncated unary scheme.

TABLE 10

| Flag bit | MPM | Mode Num. | Group Num. | Mode N m./Gr. | Code words | Code bits | Total bits | Prediction Block Num. |
|---|---|---|---|---|---|---|---|---|
| 1 | MPM | 7 | 1 | 7 | — | 0 | 1 | 7 |
|   |   | (P, D, V, H, 2, 18, 34) | 2 | 3 or 4 | 0~1 | 1 | 2 | 3 or 4 |
| 1 | Non-MPM | 60 | 2→8 | 4 or 56→7 | - → 000~111 | 1 (flag) 1 (flag) + 3 | 2 5 | 4 7 |

In this embodiment, seven MPMs are used. Thus, 60 intra modes remain as non-MPMs. In this case, MPMs may be set to the planar, DC, vertical, horizontal and three diagonal modes (directional modes 2, 18, and 34 in FIG. 1), which are most frequently used statistically.

Signaling the MPMs is substantially the same as the eighth embodiment related to Table 8. However, the signaling the non-MPM described below is different from the previous embodiments.

The video encoding apparatus and the video decoding apparatus classify four most frequently-used directional modes (e.g., directional modes 6, 14, 22, and 30 in FIG. 1, i.e., the next most probable modes) and the other intra modes among the 60 non-MPMs into different groups. The video As described above, in the various embodiments described with reference to Tables 1 to 10, the video encoding apparatus may signal the index of a group to which the intra mode for predicting the current block belongs, instead of signaling the index of a mode corresponding to the intra mode for predicting the current block in the MPM list and/or non-MPM list. In this case, the video decoding apparatus may determine the optimal intra mode (i.e., the intra mode for predicting the current block) by evaluating the intra modes belonging to the group. For example, in some embodiments, the video decoding apparatus may generate respective reconstructed blocks according to each of the multiple intra modes belonging to one group, and evaluate the reconstructed blocks to determine an optimal intra mode.

As compared with the conventional signaling method which explicitly specifies one mode among dozens of intra modes, the overhead is reduced by specifying one group among several groups. As a result, the compression efficiency is improved. As compared with the conventional method of explicitly specifying the intra mode of the current block, the amount of computation of the video decoding apparatus increases. However, in view of the trend that system performance of the video decoding apparatus is continuously improved, the video decoding apparatus may evaluate several intra modes in real time.

In order to generate a reconstructed block for each of the multiple intra modes, the video decoding apparatus needs to generate respective prediction blocks for the multiple intra modes belonging to one group and to generate residual block from the bitstream information.

The transform coefficients of the residual block for the current block are generated based on the scanning order which is determined according to the applied intra mode. For example, in the standard HEVC in which 35 intra modes are available, intra modes #6 to #14 follow the vertical scanning order, intra modes #22 to #30 follow the horizontal scanning order, and the other modes follow the diagonal scanning order. According to the present invention, the video decoding apparatus selects the intra mode of the current block, accordingly, the scanning order of the transform coefficients of the residual block may not be known until the final intra mode is selected. In order to address this issue, grouping intra modes may be performed in a manner that each group include only intra modes that use the same scanning order in scanning the transform coefficients of the residual block. When MPMs are grouped, intra modes using the same scanning order may be classified into one group, or the scanning order commonly applied to the largest number of intra modes in a group of intra modes may be selected as the representative scanning order for the group. Alternatively, one specific scanning order (e.g., a diagonal scanning order) may be used.

Figure 7:
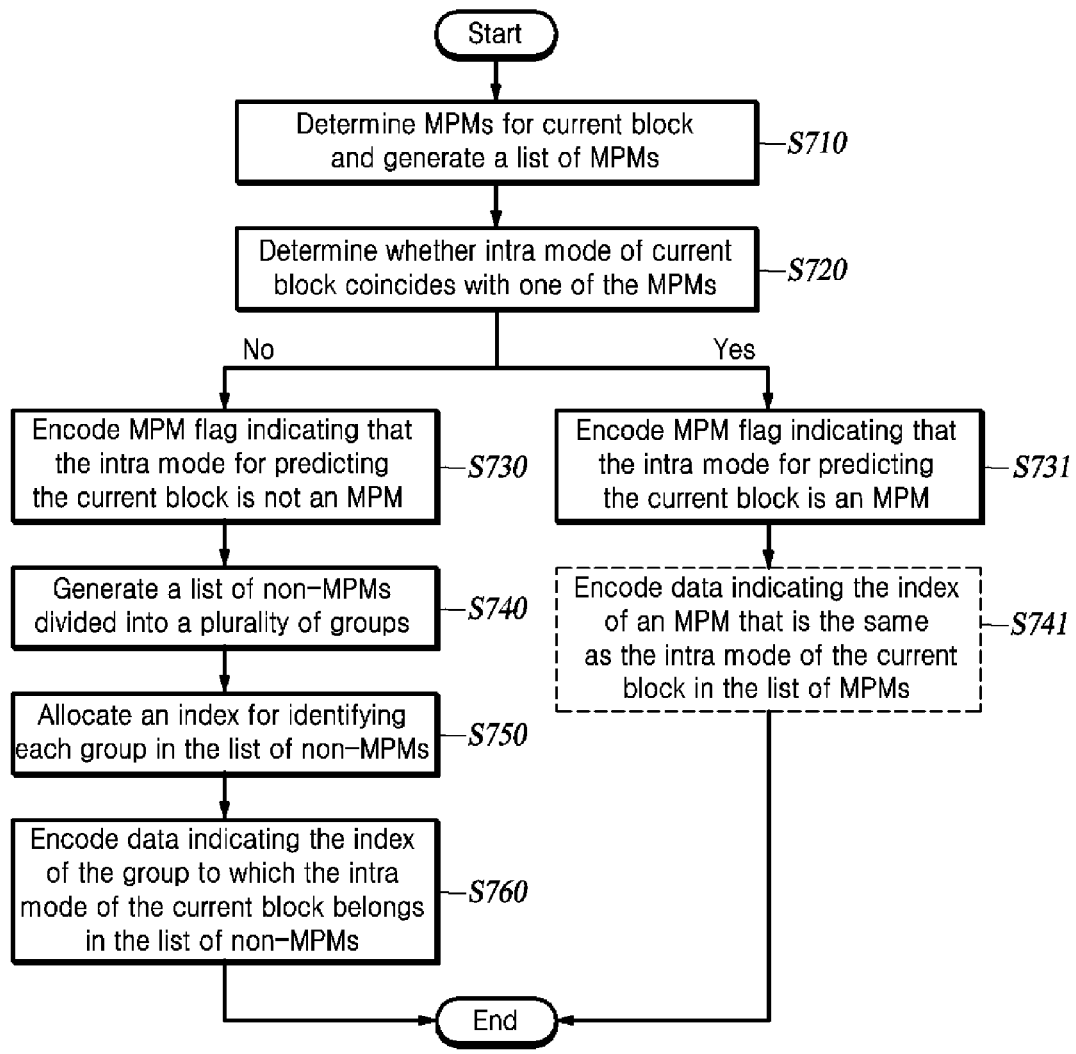
FIG. 7 is a flow diagram illustrating an exemplary method of encoding video data in accordance with one or more examples of the present invention.

FIG. 7 is a flow diagram illustrating an exemplary method of encoding video data in accordance with one or more of the foregoing examples of the present invention. In the exemplary method of FIG. 7, the video encoding apparatus determines an intra mode for predicting the current block of video data. The intra mode may refer to any of dozens of spatial compression modes.

The video encoding apparatus determines MPMs for predicting the current block of the video data and generates a list of MPMs (S710). For example, intra prediction modes of previously encoded neighboring blocks may be identified, and be considered in generating an MPM list for the current block. Alternatively, the MPMs may be predetermined based on statistics related to the likelihood of coinciding with the intra mode for predicting the current block.

The video encoding apparatus determines whether the intra mode of the current block coincides with any one mode in the MPM list (S720).

When any of the MPMs is not the same as the intra mode for predicting the current block, the video encoding apparatus encodes a 1-bit MPM flag indicating that the intra mode for predicting the current block is not an MPM (S730).

The video encoding apparatus removes the MPMs among the intra modes (e.g., 35 intra modes in HEVC) to generate a list of non-MPMs. In addition, the video encoding apparatus groups the intra modes from the list of non-MPMs into a plurality of groups (S740). In some embodiments, intra modes that use the same scanning order in scanning the transform coefficients of the residual block may be classified into the same group. In some other embodiments, the list of non-MPMs may be sorted in ascending order according to the mode numbers of the intra modes, and the intra modes sorted in ascending order may be divided into a plurality of groups. In some other embodiments, intra modes may be grouped by an integer multiple of the mode number. In some other embodiments, the video encoding apparatus may have grouping defined by some rules, and the rules may be signaled (e.g., signaled by the video encoding apparatus so as to be used by the video decoding apparatus).

The video encoding apparatus allocates a group index for identifying each group in the list of non-MPMs (S750). The video encoding apparatus encodes data indicating the index of the group to which the intra mode of the current block belongs in the list of non-MPMs (S760).

When one of the MPMs is the same as the intra mode for predicting the current block, the video encoding apparatus encodes a 1-bit MPM flag indicating that the intra mode for predicting the current block is an MPM (S731). In some embodiments, the video encoding apparatus may encode the 1-bit MPM flag, and then encode data indicating the index of an MPM that is the same as the intra mode of the current block in the list of MPMs (S741). For example, the video encoding apparatus may allocate an index for identifying each MPM according to the order of determining the MPMs. In some other embodiments, the video encoding apparatus may merely encode a 1-bit MPM flag without encoding the data indicating the index of the MPM that is the same as the intra mode of the current block in the MPM list.

Figure 8:
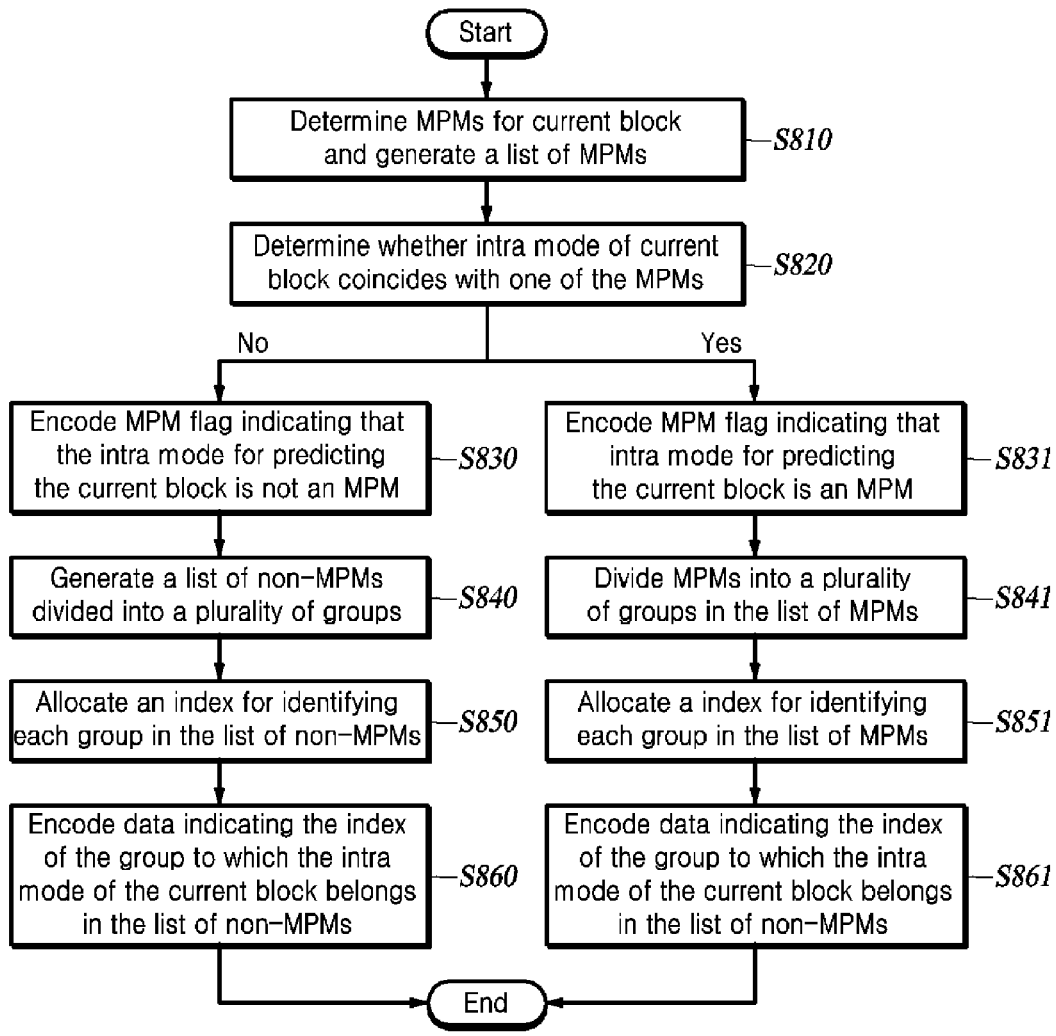
FIG. 8 is a flow diagram illustrating another exemplary method of encoding video data in accordance with one or more examples of the present invention.

FIG. 8 is a flow diagram illustrating another exemplary method of encoding video data in accordance with one or more of the foregoing examples of the present invention.

In the exemplary method of FIG. 8, S810, S820, S830, S840, S850, and S860 are identical to S710, S720, S730, S740, S750, and S760 of FIG. 7, respectively. In the exemplary method of FIG. 8, when one of the MPMs is the same as the intra mode for predicting the current block, the video encoding apparatus encodes a 1-bit MPM flag indicating that the intra mode for predicting the current block is an MPM (S831).

The video encoding apparatus groups the intra modes from the list of MPMs into a plurality of groups. In some embodiments, intra modes that use the same scanning order in scanning the transform coefficients of the residual block may be classified into the same group. In some other embodiments, the video encoding apparatus may group the respective MPMs according to the order of determining the MPMs. In some other embodiments, the video encoding apparatus may sort the list of MPMs in ascending order according to the mode numbers of the intra modes, and divide the intra modes sorted in ascending order into a plurality of groups. In some other embodiments, the grouping may be defined by some rules, and the rules may be signaled (e.g., signaled by the video encoding apparatus so as to be used by the video decoding apparatus).

The video encoding apparatus allocates a group index for identifying each group in the list of MPMs (S851). The video encoding apparatus encodes data indicating the index of the group to which the intra mode of the current block belongs in the list of MPMs (S861). However, when the number of groups is 1, data indicating the index of the group is not encoded.

Figure 9:
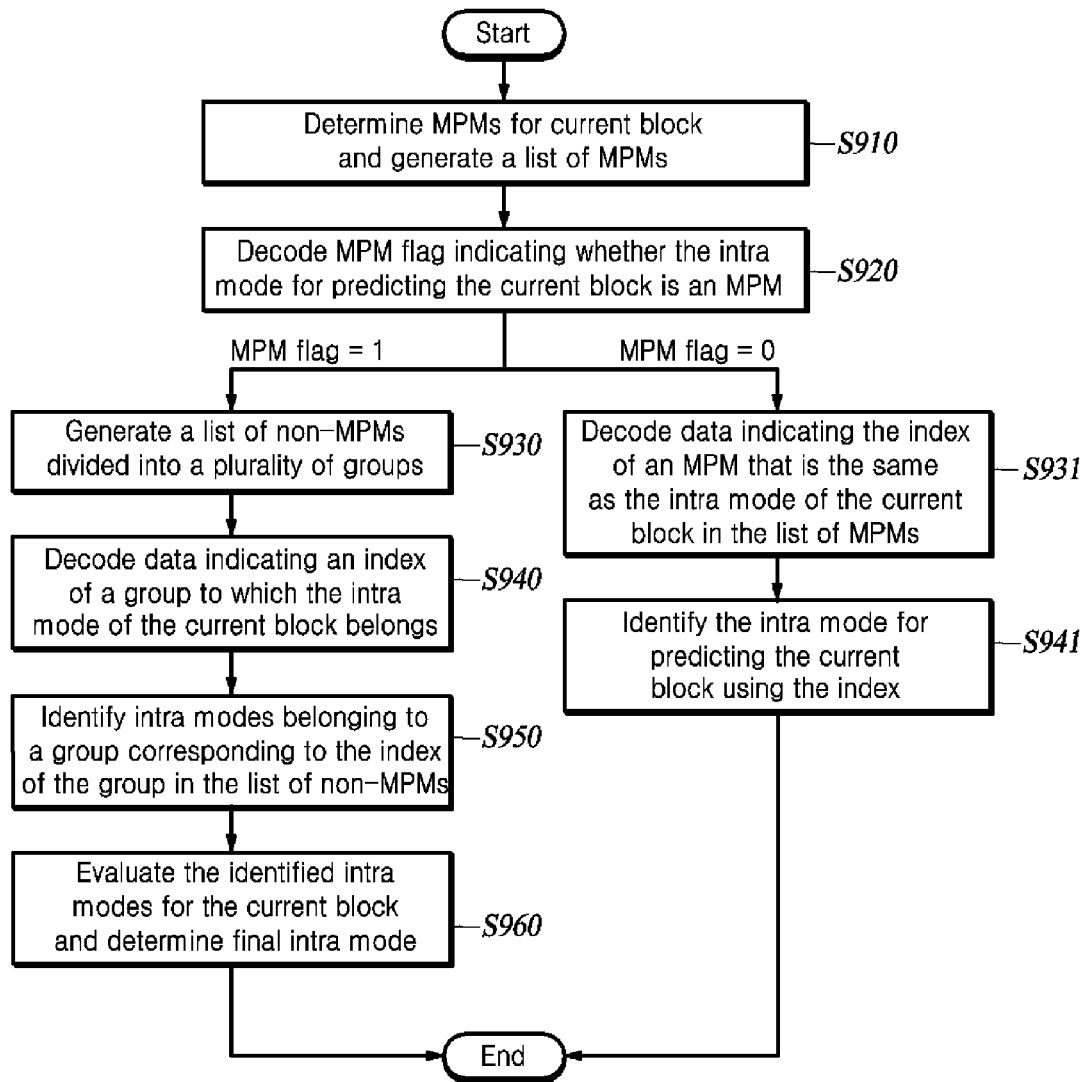
FIG. 9 is a flow diagram illustrating an exemplary method of decoding video data in accordance with one or more examples of the present invention.

FIG. 9 is a flow diagram illustrating an exemplary method of decoding video data in accordance with one or more of the foregoing examples of the present invention. In the exemplary method of FIG. 9, the video decoding apparatus determines MPMs for the current block and generates a list of MPMs (S910). For example, the video decoding apparatus may generate a list of MPMs and allocate index values to the respective MPMs in the list. For example, the video encoding apparatus may allocate an index for identifying each MPM according to the order of determining the MPMs.

The video decoding apparatus decodes the MPM flag indicating whether the intra mode for predicting the current block is an MPM (S920).

When the value of the MPM flag indicates that the intra mode for predicting the current block is not an MPM (MPM flag=1 in FIG. 9), the video decoding apparatus, as in the case of the video encoding apparatus, removes the MPMs among the intra modes to generate a list of non-MPMs, and groups the intra modes from the list of non-MPMs into a plurality of groups (S930). In addition, the video decoding apparatus may allocate a group index for identifying each group in the list of non-MPMs.

The video decoding apparatus decodes data indicating an index of a group to which the intra mode of the current block belongs in the list of non-MPMs from the encoded bitstream (S940).

The video decoding apparatus identifies intra modes belonging to a group corresponding to the index of the decoded group in the list of non-MPMs, using the index of the decoded group (S950).

The video decoding apparatus evaluates the identified intra modes for the current block and determines an intra mode for predicting the current block (S960). For example, in some embodiments, the video decoding apparatus may generate reconstructed blocks and evaluate the reconstructed blocks for multiple intra modes belonging to one group to determine an optimal intra mode.

When the value of the MPM flag indicates that the intra mode for predicting the current block is an MPM (MPM flag=0 in FIG. 9), the video decoding apparatus decodes data indicating the index of the MPM that is the same as the intra mode of the current block in the list of MPMs from the encoded bitstream (S931). The video decoding apparatus identifies the intra mode for predicting the current block in the list of MPMs using the index of the MPM that is same as the intra mode of the current block (S941). The video decoding apparatus may decode the current block in the identified intra mode for the current block.

Figure 10:
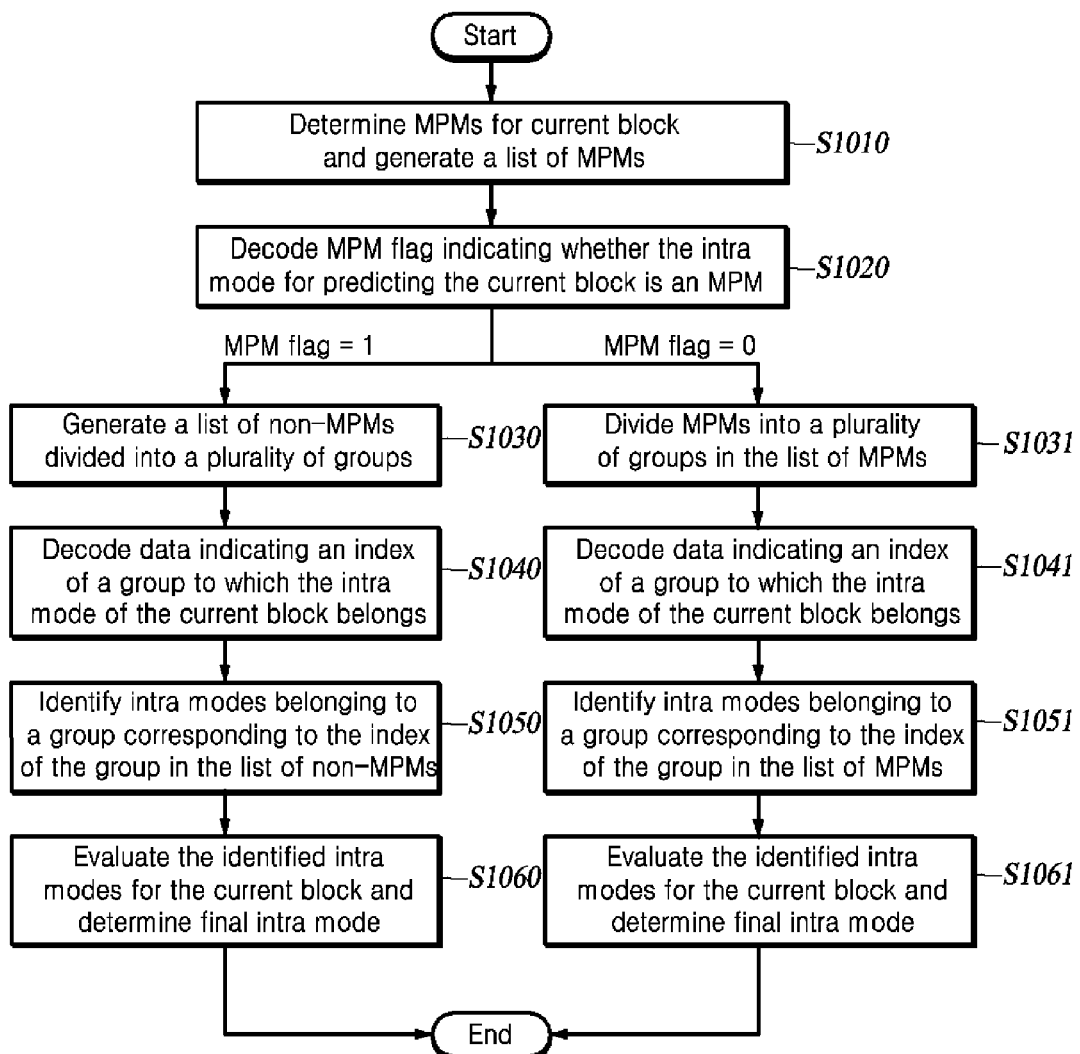
FIG. 10 is a flow diagram illustrating another exemplary method of decoding video data in accordance with one or more examples of the present invention.

FIG. 10 is a flow diagram illustrating another exemplary method of decoding video data in accordance with one or more of the foregoing examples of the present invention.

In the exemplary method of FIG. 10, S1010, S1020, S1030, S1040, S1050, and S1060 are identical to S910, S920, S930, S940, S950, and S960 of FIG. 9, respectively. In the exemplary method of FIG. 10, when the value of the MPM flag indicates that the intra mode for predicting the current block is an MPM (MPM flag=0 in FIG. 9), the video decoding apparatus, as in the case of the video encoding apparatus, groups the intra modes from the list of MPMs into a plurality of groups (S1031). The video decoding apparatus may allocate a group index for identifying each group in the list of MPMs.

The video decoding apparatus decodes data indicating an index of a group to which the intra mode of the current block belongs in the list of MPMs from the encoded bitstream (S1041). However, when the number of groups is 1, the video decoding apparatus may not decode the data indicating the index of the group, but may automatically set the value thereof to 0.

The video decoding apparatus identifies intra modes belonging to the group corresponding to the index of the decoded group in the list of MPMs using the index of the decoded group (S1051).

The video decoding apparatus evaluates the identified intra modes for the current block and determines an intra mode for predicting the current block (S1061). For example, in some embodiments, the video decoding apparatus may generate reconstructed blocks and evaluate the reconstructed blocks for multiple intra modes belonging to one group to determine an optimal intra mode.

Figures 11A, 11B:
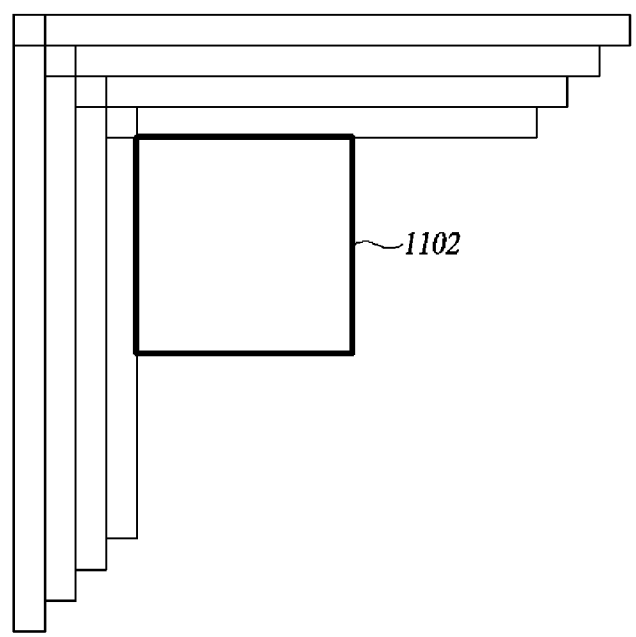
FIGS. 11A and 11B are a diagram illustrating reference pixels used in generating a prediction block in intra prediction coding.

In FIGS. 11A and 11B, is a diagram illustrating reference samples used in generating a prediction block in intra prediction coding.

In the embodiments described above, for reference samples used to predict the current block, reconstructed pixel values of one row immediately adjacent to a block 1101 to be encoded as shown in FIG. 11B may be used, or information in multiple lines as shown in FIG. 11B may be used.

Three methods of generating reference samples using multiple lines can be considered. The first method is to select one optimal line from among n predetermined lines, generate values of the reference samples using the selected line, and signal the position information about the one line. The second method is to generate values of the reference samples using information of the n lines. In this case, no separate signaling information is needed. The third method is to generate the reference samples using information of m (m<n) lines out of n lines, and needs to signal information of m lines.

When reference samples are generated using multiple (n or m) lines, the reference samples may be generated simply using the average value, or may be generated by estimating an average value by assigning a higher weight to the line adjacent to the block 1102 to be encoded. In this case, these operations should be performed by the video encoding apparatus and the video decoding apparatus in the same manner.

Although exemplary embodiments have been described for illustrative purposes, those skilled in the art will appreciate that and various modifications and changes are possible, without departing from the idea and scope of the embodiments. Exemplary embodiments have been described for the sake of brevity and clarity. Accordingly, one of ordinary skill would understand the scope of the embodiments is not limited by the explicitly described above embodiments but is inclusive of the claims and equivalents thereof.

The invention claimed is:

1. A method for encoding video data, the method comprising:
    encoding position information which indicates one reference line selected among a plurality of reference lines neighboring with a current block of the video data,
    encoding intra mode data which specifies an intra mode of the current block for predicting the current block;
    predicting the current block using the reference line indicated by the position information based on the intra mode of the current block to generate a predicted block;
    generating a residual block of the current block based on the predicted block; and
    encoding residual data which specifies the residual block of the current block,
    wherein the encoding of intra mode data comprises, when the intra mode of the current block is an MPM, encoding one or more syntax elements which specify the intra mode of the current block among a plurality of MPMs, and wherein the one or more syntax elements include at least one of:
a first syntax element indicating which MPM group of the two MPM groups the intra mode of the current block belongs to, wherein one of the two MPM groups includes at least Planar mode and the other of two MPM groups includes intra modes derived from reconstructed blocks neighboring with the current block; and
a second syntax element indicating one of the MPMs belonging to the MPM group indicated by the first syntax element.

2. The method according to claim 1, wherein the encoding of intra mode data further comprises:
when the intra mode of the current block is not an MPM, generating a list of non-MPMs by removing the MPMs from available intra modes;
sorting the non-MPMs in ascending order according to mode values of the intra modes;
dividing the intra modes sorted in the ascending order into a plurality of non-MPM groups; and
encoding a syntax element indicating a non-MPM group to which the intra mode of the current block belongs, without encoding data indicating an index of the same non-MPM as the intra of the current block within the non-MPM group indicated by the syntax element.

3. The method according to claim 1, wherein the encoding of intra mode data further comprises:
when the intra mode of the current block is not an MPM, generating a list of non-MPMs by removing the MPMs from available intra modes;
dividing the non-MPMs into a plurality of non-MPM groups, such that intra modes belonging to the same non-MPM group use the same scanning order in scanning transform coefficients of a residual block; and
encoding a syntax element indicating a non-MPM group to which the intra mode of the current block belongs, without encoding data indicating an index of the same non-MPM as the intra mode of the current block within the non-MPM group indicated by the syntax element.

4. The method according to claim 1, wherein the encoding of intra mode data further comprises:
when the intra mode of the current block is not an MPM, generating a list of non-MPMs by removing the MPMs from available intra modes;
dividing the non-MPMs into a plurality of non-MPM groups, wherein the plurality of non-MPM groups comprises a first group and a second group, and wherein the first group comprises intra modes determined based on statistics related to a possibility of coinciding with the intra mode of the current block, and the second group is divided into a plurality of subgroups;
encoding one or more syntax elements indicating a non-MPM group and/or a subgroup to which the intra mode of the current block belongs; and
encoding data specifying an intra mode coinciding with the intra mode of the current block within the non-MPM group and/or the subgroup to which the intra mode of the current block belongs.

5. A method for decoding video data, the method comprising:
decoding, from a bitstream, position information which indicates one reference line selected among a plurality of reference lines neighboring with a current block of the video data;
decoding, from the bitstream, intra mode data which specifies an intra mode of the current block for predicting the current block;
predicting the current block using the reference line indicated by the position information based on the intra mode of the current block to generate a predicted block of the current block;
decoding, from the bitstream, a residual block of the current block; and
reconstructing the current block based on the predicted block and the residual block,
wherein the decoding of intra mode data comprises, when the intra mode of the current block is an MPM, decoding one or more syntax elements which specify the intra mode of the current block among a plurality of MPMs,
and wherein the one or more syntax elements include at least one of:
a first syntax element indicating which MPM group of the two MPM groups the intra mode of the current block belongs to, wherein one of the two MPM groups includes at least Planar mode and the other of two MPM groups includes intra modes derived from reconstructed blocks neighboring with the current block; and
a second syntax element indicating one of the MPMs belonging to the MPM group indicated by the first syntax element.

6. The method according to claim 5, wherein the decoding of intra mode data further comprises:
when the intra mode of the current block is not an MPM, generating a list of non-MPMs by removing the MPMs from available intra modes;
sorting the non-MPMs in ascending order according to mode values of the intra modes;
dividing the intra modes sorted in the ascending order into a plurality of non-MPM groups; and
decoding a syntax element indicating a non-MPM group to which the intra mode of the current block belongs,
and wherein the intra predictor is further configured to evaluate the non-MPMs belonging to the non-MPM group indicated the syntax element to determine the intra mode of the current block among the evaluated non-MPMs.

7. The method according to claim 5, wherein the decoding of intra mode data further comprises:
when the intra mode of the current block is not an MPM, generating a list of non-MPMs by removing the plurality of MPMs from available intra modes;
dividing the non-MPMs into a plurality of non-MPM groups, such that intra modes belonging to the same group use the same scanning order in scanning transform coefficients of a residual block; and
further decoding a syntax element indicating a non-MPM group to which the intra mode for predicting the current block belongs,
and wherein the intra predictor is further configured to evaluate the non-MPMs belonging to the non-MPM group indicated the syntax element to determine the intra mode of the current block among the evaluated non-MPMs.

8. The method according to claim 5, wherein decoding of intra mode data further comprises:

when the intra mode for predicting the current block is not an MPM, generating a list of non-MPMs by removing the MPMs from available intra modes;

dividing the non-MPMs into a plurality of non-MPM groups, wherein the plurality of non-MPM groups comprises a first group and a second group, the first group including intra modes determined based on statistics related to a possibility of coinciding with the intra mode of the current block, and the second group is further divided into a plurality of subgroups;

decoding, from the bitstream, one or more syntax elements indicating a non-MPM group and/or a subgroup to which the intra mode of the current block belongs; and decoding, from the bitstream, data specifying an intra mode coinciding with the intra mode of the current block in the non-MPM group and/or the subgroup to which the intra mode of the current block.

9. A non-transitory computer readable medium storing a bitstream generated by encoding video data, the bitstream generated by processes of:

encoding position information which indicates one reference line selected among a plurality of reference lines neighboring with a current block of the video data, encoding intra mode data which specifies an intra mode of the current block for predicting the current block;

predicting the current block using the reference line indicated by the position information based on the intra mode of the current block to generate a predicted block of the current block;

generating a residual block of the current block based on the predicted block; and encoding the residual block of the current block, wherein the encoding of intra mode data comprises, when the intra mode of the current block is an MPM, encoding one or more syntax elements which specify the intra mode of the current block among a plurality of MPMs, and wherein the one or more syntax elements include at least one of:

a first syntax element indicating which MPM group of the two MPM groups the intra mode of the current block belongs to, wherein one of the two MPM groups includes at least Planar mode and the other of two MPM groups includes intra modes derived from reconstructed blocks neighboring with the current block; and a second syntax element indicating one of the MPMs belonging to the MPM group indicated by the first syntax element.

* * * * *